US011754717B2

(12) United States Patent
Nakamura et al.

(10) Patent No.: US 11,754,717 B2
(45) Date of Patent: Sep. 12, 2023

(54) DISTANCE MEASUREMENT DEVICE HAVING EXTERNAL LIGHT ILLUMINANCE MEASUREMENT FUNCTION AND EXTERNAL LIGHT ILLUMINANCE MEASUREMENT METHOD

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 433 days.

(21) Appl. No.: 16/908,739

(22) Filed: Jun. 23, 2020

(65) Prior Publication Data
US 2020/0408916 A1  Dec. 31, 2020

(30) Foreign Application Priority Data
Jun. 25, 2019 (JP) ................. 2019-117618

(51) Int. Cl.
*G01S 17/894* (2020.01)
*G01B 11/14* (2006.01)
(Continued)

(52) U.S. Cl.
CPC .......... *G01S 17/894* (2020.01); *G01B 11/14* (2013.01); *G01S 17/42* (2013.01); *G01S 17/88* (2013.01); *G01S 7/4865* (2013.01); *G01S 7/51* (2013.01)

(58) Field of Classification Search
CPC ......... G01S 7/4865; G01S 17/42; G01S 17/88
See application file for complete search history.

(56) References Cited

U.S. PATENT DOCUMENTS 5,200,602 A * 4/1993 Ikebe .................. G02B 7/28
396/106
2001/0046317 A1 * 11/2001 Kamon ................ G06T 7/521
382/154
(Continued)

FOREIGN PATENT DOCUMENTS

| JP | H438436 A | 2/1992 |
| JP | H989659 A | 4/1997 |

(Continued)

*Primary Examiner* — Fabio S Lima
(74) *Attorney, Agent, or Firm* — HAUPTMAN HAM, LLP

(57) ABSTRACT

A distance measurement device includes a light emission unit which is capable of emitting measurement light to be irradiated toward an object, a light reception unit configured to receive light from the object via an optical filter through which light having the same wavelength band as the measurement light passes, a distance calculation unit configured to calculate a distance to the object based on each charge amount obtained by accumulating a charge corresponding to the received light at a plurality of timings which are delayed by a predetermined phase with respect to emission timing of the measurement light, and an external light intensity calculation unit configured to calculate external light illuminance of external light illuminating the object at the spectral sensitivity of the optical filter based on the charge amounts acquired at the light reception unit and a reflectivity of the object.

11 Claims, 13 Drawing Sheets

(51) Int. Cl.
  *G01S 17/42* (2006.01)
  *G01S 17/88* (2006.01)
  *G01S 7/51* (2006.01)
  *G01S 7/4865* (2020.01)

(56) References Cited

U.S. PATENT DOCUMENTS

| | | | | |
|---|---|---|---|---|
| 2003/0063775 | A1* | 4/2003 | Rafii | G06T 7/75 |
| | | | | 382/280 |
| 2010/0231712 | A1 | 9/2010 | Suenobu et al. | |
| 2011/0176709 | A1* | 7/2011 | Park | G06T 7/521 |
| | | | | 382/106 |
| 2012/0098935 | A1 | 4/2012 | Schmidt et al. | |
| 2016/0248953 | A1* | 8/2016 | Fujita | H04N 23/56 |
| 2018/0011194 | A1* | 1/2018 | Masuda | G01C 3/06 |
| 2019/0265333 | A1* | 8/2019 | Ueno | G01S 17/42 |
| 2020/0033475 | A1* | 1/2020 | Nakamura | G01S 17/36 |
| 2020/0124726 | A1* | 4/2020 | Geuens | G01S 17/10 |
| 2020/0271783 | A1* | 8/2020 | Koyama | G01S 17/08 |
| 2020/0284575 | A1* | 9/2020 | Yao | H04N 23/71 |
| 2020/0300987 | A1* | 9/2020 | Ta | G01S 7/4865 |
| 2020/0320318 | A1* | 10/2020 | Ramaglia | B60Q 3/242 |
| 2021/0145536 | A1* | 5/2021 | Vayser | A61B 90/36 |
| 2021/0228300 | A1* | 7/2021 | DaCosta | A61B 6/107 |
| 2021/0329207 | A1* | 10/2021 | Feng | H04N 9/646 |
| 2022/0011440 | A1* | 1/2022 | Kato | G01S 17/10 |
| 2022/0057520 | A1* | 2/2022 | Mah | G01S 17/931 |
| 2022/0124995 | A1* | 4/2022 | Cunningham | A01G 9/246 |
| 2022/0230455 | A1* | 7/2022 | Popovic | G06V 20/59 |
| 2022/0350001 | A1* | 11/2022 | Sakakibara | G01S 7/4861 |

FOREIGN PATENT DOCUMENTS

| | | |
|---|---|---|
| JP | 2000-298005 A | 10/2000 |
| JP | 20014339 A | 1/2001 |
| JP | 20085017 A | 1/2008 |
| JP | 2009-002823 A | 1/2009 |
| JP | 201877071 A | 5/2018 |
| WO | 2009066364 A1 | 5/2009 |
| WO | 2014132767 A1 | 9/2014 |

\* cited by examiner

INFLUENCE OF EXTERNAL LIGHT ON DISTANCE MEASUREMENT ACCURACY

INFLUENCE OF EXTERNAL LIGHT ON SATURATION

INFLUENCE OF EXTERNAL LIGHT ON SATURATION

DISTANCE MEASUREMENT DEVICE HAVING EXTERNAL LIGHT ILLUMINANCE MEASUREMENT FUNCTION AND EXTERNAL LIGHT ILLUMINANCE MEASUREMENT METHOD

RELATED APPLICATIONS

The present application claims priority to Japanese Application Number 2019-117618, filed Jun. 25, 2019, the disclosure of which is hereby incorporated by reference herein in its entirety.

BACKGROUND OF THE INVENTION

1. Field of the Invention

The present invention relates to a distance measurement device, and in particular, relates to a distance measurement device having an external light illuminance measurement function and an external light illuminance measurement method.

2. Description of the Related Art

TOF (time of flight) cameras which output a distance based on time of flight of light are known as distance measuring devices for measuring the distance to an object. Many TOF cameras use a phase difference method in which a target space is irradiated with measurement light which is intensity-modulated over predetermined cycles, and the distance to the target space is calculated based on a phase difference between the measurement light and the light reflected from the target space.

External light (also referred to as "ambient light") influences the distance measurement accuracy of such TOF cameras or the degree of occurrence of the inability to perform distance measurement. The influence of external light on distance measurement accuracy is shown in FIGS. 10A and 10B. Generally, light-receiving elements generate so-called "shot noise" when detecting the number of photons by the photoelectric effect, and the variation width of the shot noise can be described by the variance σ of the Poisson distribution. As shown in FIG. 10A, the variation width σ of the shot noise increases as the strength of the reflected light Ab of the external light increases ($\sigma_b$), but decreases as the strength of the reflected external light decreases ($\sigma_s$). Even if the reflected light of the external light is simply subtracted from the charge amount, since the variation widths $\sigma_b$ and $\sigma_s$ of the shot noise remain, the greater the reflected light of the external light, the larger the variation width ($\sigma_b$), whereby significant deterioration of the distance measurement accuracy occurs.

Furthermore, the influence of external light on the inability to perform distance measurement (so-called saturation) is shown in FIGS. 11A and 11B. The light reception unit of a TOF camera receives not only reflected measurement light but also reflected external light. Thus, when the reflected external light is strong, the light reception unit becomes saturated, whereby saturation can easily occur. When saturation is detected, the charge amount read out is incorrect, whereby it is difficult to calculate a distance measurement value, and thus, it is determined that distance measurement is impossible.

Since such external light influences the distance measurement accuracy of a TOF camera or the degree of occurrence of the inability to perform distance measurement, when a TOF camera is used with focus on these conditions, it is necessary to define the upper limit of the external light in the use conditions in addition to the use conditions of the TOF camera such as the distance measurement range and the reflectivity of the measurement object. The following documents are known as prior art related to such a TOF camera or external light illuminance.

Japanese Unexamined Patent Publication (Kokai) No. 2018-77071 describes a distance measurement device which acquires the intensity of ambient light and sets driving conditions of a light source based on the intensity of the ambient light and the storage capacity of a charge storage unit, since distance measurement accuracy is reduced when there is strong ambient light such as sunlight.

Japanese Unexamined Patent Publication (Kokai) No. 9-89659 describes arranging a reflective object having a predetermined reflective surface on a measurement point, measuring the brightness of the reflected light in a predetermined direction from the reflective surface, and calculating the illuminance of the measurement point based on the measurement value of the brightness and reflectivity.

Japanese Unexamined Patent Publication (Kokai) No. 2001-4339 describes an image recognition inspection system which accurately measures illumination variation of a lighting device by excluding negative influence caused by variations in reflectivity of a reflective surface by extracting only image data of the same part of the reflective surface to be measured and acquiring the illuminance distribution of the lighting device from the luminance in the image data.

Japanese Unexamined Patent Publication (Kokai) No. 2008-5017 describes a vehicle compartment observation device which measures illuminance (in particular the illuminance of an occupant) based on the brightness of an image taken by a camera used for observing the vehicle compartment.

WO 2009/066364 describes an imaging device which sets the brightness of an object to a value suitable for recognition even when the illuminance of the monitoring range is not uniform by capturing an image of the object to be monitored, performing recognition processing on the captured object, calculating the position and illuminance in the real space of the object based on the brightness and position, and determining exposure based on the calculated position and illuminance.

Japanese Unexamined Patent Publication (Kokai) No. 4-38436 describes a light distribution measurement device for a light source comprising a screen which captures emitted light, a television camera which captures an optical image of a light distribution pattern formed on the screen and converts it into electrical signals, and an image processing device which calculates a two-dimensional brightness of the optical image captured by the television camera by comparing it with a reference brightness, and calculates illuminance data from the two-dimensional brightness data and data of the angular reflectivity distribution of the screen.

SUMMARY OF THE INVENTION

The illuminance of external light is conventionally measured using a so-called "lux meter" (illuminance meter), and as shown in FIG. 12A, commercially available lux meters are adjusted to, for example, the spectral sensitivity of the naked eye. However, as shown in FIG. 12B, general TOF cameras are designed to emit, for example, near-infrared light having a center wavelength of 850 nm as measurement light, and to receive light of the same wavelength band as the measurement light to the greatest extent possible. Thus, commonly the external light illuminance measured by a conventional lux meter is not linked to the distance measurement accuracy or degree of occurrence of inability to perform distance measurement of TOF cameras. Therefore, it cannot be recognized that the distance measurement value of a TOF camera deviates from a specified distance measurement accuracy due to strong external light. Furthermore, if the measurement object when the TOF camera is installed happens to be a low-reflectivity (e.g., a black) object, saturation will not occur even in the presence of strong external light. However, when a highly reflective (e.g., white) object subsequently enters the distance measurement space, suddenly saturation occurs, rendering distance measurement impossible.

Thus, there is a need for a technology for more accurately measuring external light illuminance according to the spectral sensitivity of a distance measurement device not only at the time of installation of the distance measurement device but also during a distance measurement operation.

An aspect of the present disclosure provides a distance measurement device, comprising a light emission unit which is capable of emitting measurement light to be irradiated toward an object, a light reception unit configured to receive light from the object via an optical filter through which light having the same wavelength band as the measurement light passes, a distance calculation unit configured to calculate a distance to the object based on each charge amount obtained by accumulating a charge corresponding to the received light at a plurality of timings which are delayed by a predetermined phase with respect to emission timing of the measurement light, and an external light illuminance calculation unit configured to calculate external light illuminance of external light illuminating the object at the spectral sensitivity of the optical filter based on the charge amounts acquired at the light reception unit and a reflectivity of the object.

Another aspect of the present disclosure provides an external light illuminance measurement method, comprising the steps of selecting whether or not to emit measurement light to be irradiated toward an object, receiving light from the object via an optical filter through which light having the same wavelength band as the measurement light passes, and calculating external light illuminance of external light illuminating the object at the spectral sensitivity of the optical filter based on charge amounts corresponding to the received light and a reflectivity of the object.

DETAILED DESCRIPTION

Figure 1:
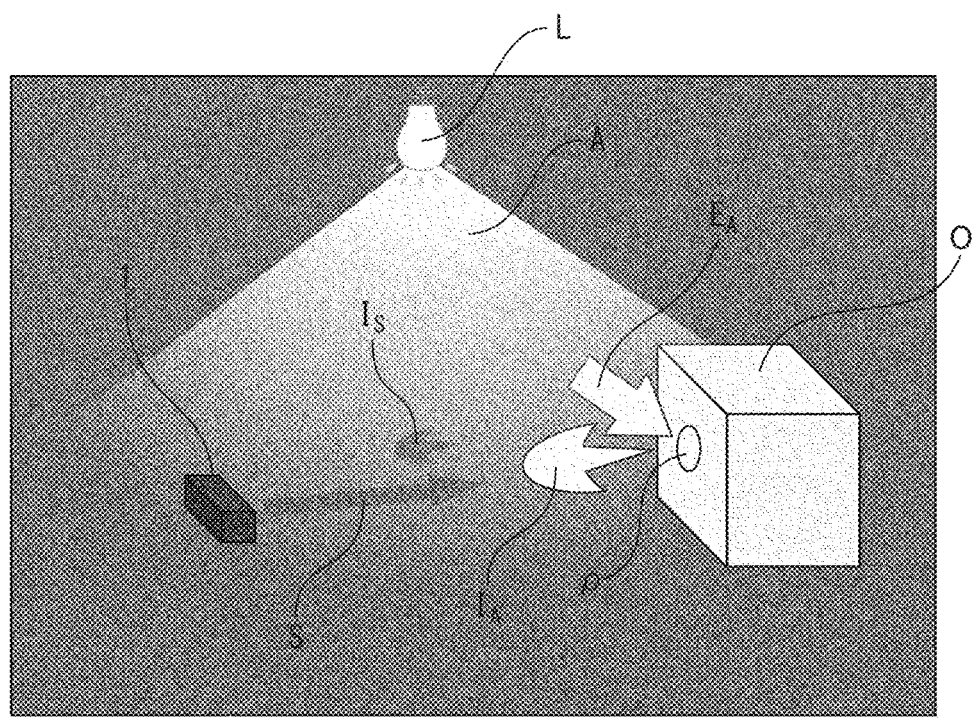
FIG. 1 is a view illustrating the definitions of the terms used in the present description.

The embodiments of the present disclosure will be described in detail below with reference to the attached drawings. In the drawings, identical or similar constituent elements have been assigned the same or similar signs. Furthermore, the embodiments described below do not limit the technical scope of the inventions or the definitions of the terms described in the claims.

FIG. 1 is a view showing the definitions of the terms used in the present description. A distance measurement device 1, an object O, and an external light source L are illustrated in FIG. 1. In the present description, the phrase "measurement light" (represented by sign S) means light which is emitted from a light emission unit of the distance measurement device 1 toward the object O, the phrase "reflected brightness of the measurement light" (represented by sign $I_s$) means the reflected intensity of the measurement light S reflected at the object O. Furthermore, in the present description, the phrase "external light" (represented by sign A) means the light emitted from the external light source L other than the distance measurement device 1, and the phrase "external light illuminance" (represented by sign $E_A$) means the intensity of the external light A with which the external light source L irradiates the object O at the spectral sensitivity of the distance measurement device 1. Further, in the present description, the phrase "reflected brightness of the external light" (represented by sign $I_A$) means the intensity of the external light A reflected at the object O at the spectral sensitivity of the distance measurement device 1. Furthermore, the phrase "reflectivity of the object" (represented by sign p) means the calculated reflectivity of the object O at the spectral sensitivity of the distance measurement device 1 or the known reflectivity of the object at the spectral sensitivity of the distance measurement device 1.

Figure 2:
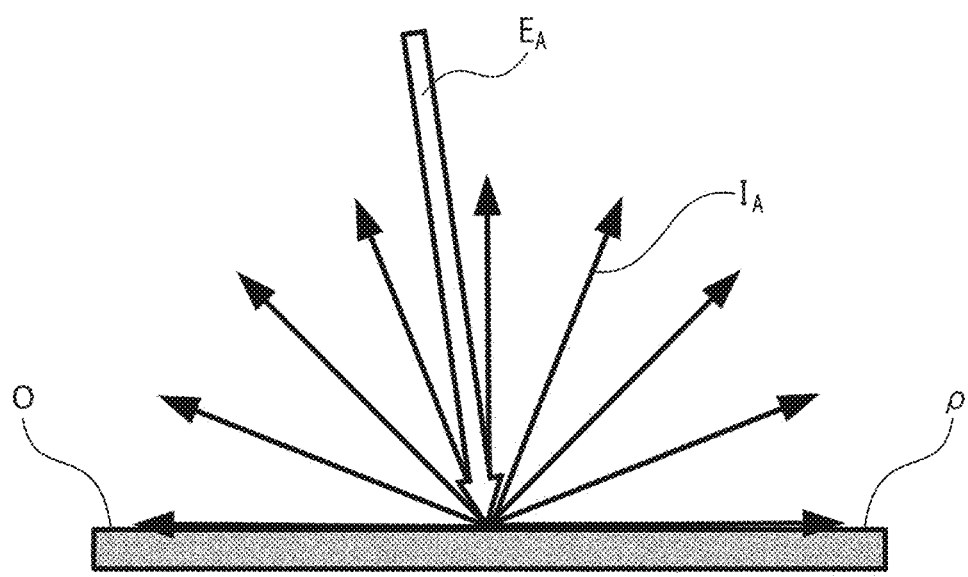
FIG. 2 is a view showing the status of the external light illuminance of the external light illuminating an object and the reflected brightness of the external light reflected at the object.

FIG. 2 is a view showing the status of the external light illuminance $E_A$ on the object and the reflected brightness $I_A$ of the external light. When the object has a uniformly-diffusing reflective surface having a reflectivity ρ, the relationship represented by the following formula holds. Note that in this formula, π is the ratio of the circumference of a circle to its diameter. In other words, the external light illuminance $E_A$ on the object O can be determined from the reflected brightness $I_A$ of the external light from the object O and the reflectivity $\rho$ of the object O.

[Formula 1]

$$E_A = \frac{\pi}{\rho} I_A \qquad 1$$

Figure 3:
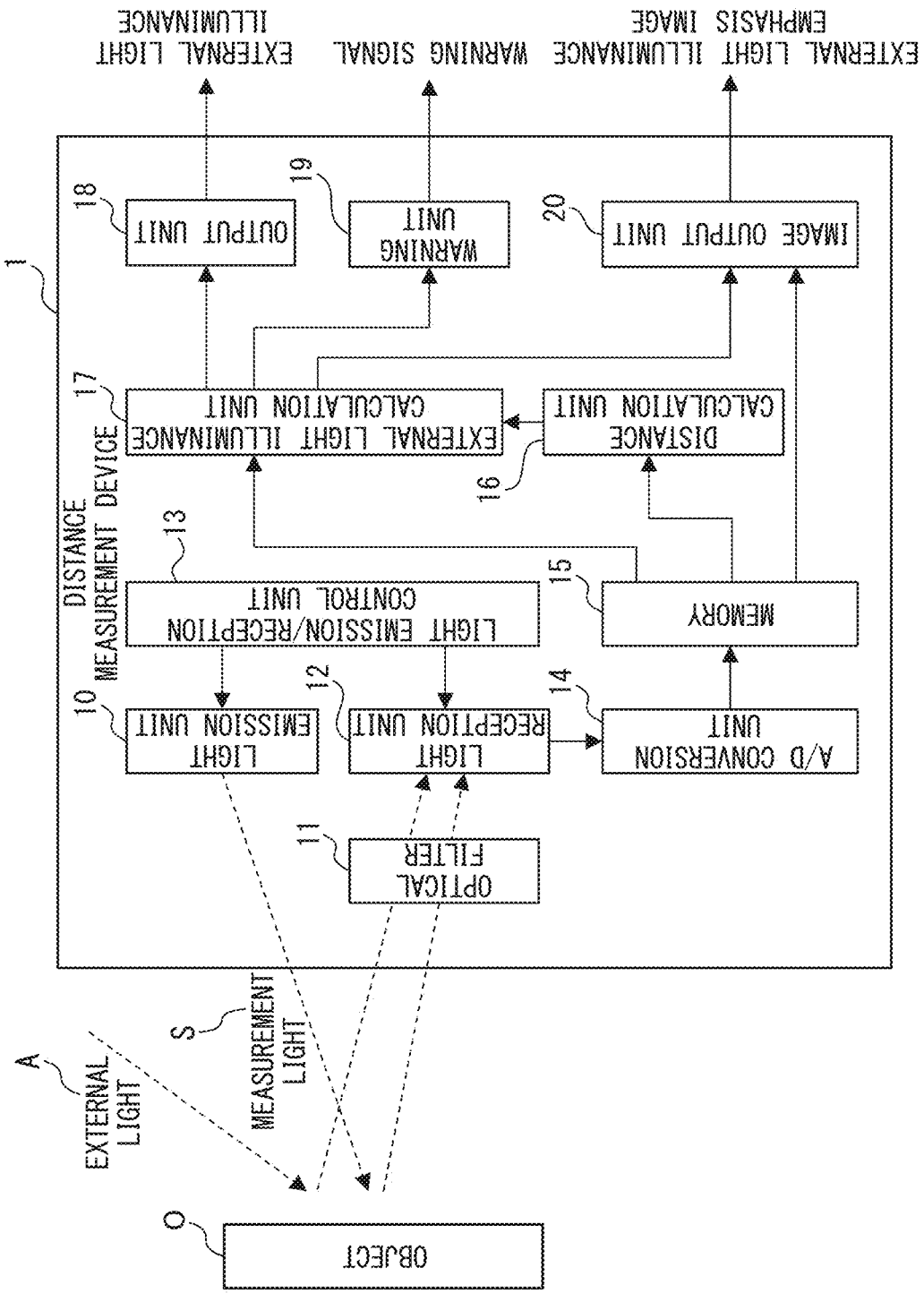
FIG. 3 is a block diagram showing the structure of a distance measurement device according to an embodiment.

FIG. 3 shows the structure of the distance measurement device 1 according to the present embodiment. The distance measurement device 1 comprises a light emission unit 10, an optical filter 11, a light reception unit 12, a light emission/reception control unit 13, an A/D conversion unit 14, a memory 15, a distance calculation unit 16, and an external light illuminance calculation unit 17. The distance measurement device 1 may further comprise at least one of an output unit 18, a warning unit 19, and an image output unit 20. At least one of the memory 15, the distance calculation unit 16, the external light illuminance calculation unit 17, the output unit 18, the warning unit 19, and the image output unit 20 may be constituted by a semiconductor integrated circuit such as a known processor, for example, a CPU (central processing unit), or an FPGA (field-programmable gate array).

The light emission unit 10 comprises a light source which emits intensity-modulated measurement light S, for example a light-emitting diode, a semiconductor laser, etc., and is capable of selectively emitting the measurement light S toward the object O. The measurement light S is, for example, near-infrared light, and may be light of another wavelength as long as the light is suitable for distance measurement.

The optical filter 11 is designed to have a spectral sensitivity such that light of the same wavelength band as the measurement light S passes therethrough. The light passing through the optical filter 11 is, for example, near-infrared light, like the measurement light S, and not only the reflected measurement light S reflected at the object O, but also the reflected light of the same wavelength band as the measurement light S in the reflected external light A reflected at the object O passes therethrough.

The light reception unit 12 comprises, for example, a light-receiving element, a capacitor, etc., receives light from the object O via the optical filter 11, and accumulates charge in accordance with the received light. The light reception unit 12 may comprise a single light-receiving element, or may comprise a plurality of two-dimensionally arrayed light-receiving elements, for example, a CCD (charge-coupled device) image sensor, a CMOS (complementary metal-oxide semiconductor) image sensor, etc.

The light emission/reception control unit 13 comprises a known control circuit which controls the emission timing of the light emission unit 10 and the reception timing of the light reception unit 12, and is controlled by the processor described above. The A/D conversion unit 14 comprises, for example, an A/D converter, etc., and A/D converts the charge amount in accordance with the received light. The memory 15 comprises, for example, a semiconductor memory, a magnetic storage device, etc., and stores the A/D converted charge amount.

The distance calculation unit 16 calculates the distance to the object O based on each charge amount accumulated at a plurality of timings which are delayed by a predetermined phase with respect to the emission timing of the measurement light S. For example, the light reception unit 12 accumulates charge amounts Q1 to Q4 at a plurality of timings delayed by 0°, 90°, 180°, and 270° with respect to the emission timing of the measurement light S, respectively, and the distance calculation unit 16 calculates the distance d to the object O based on each charge amount Q1 to Q4. For example, the formula for calculating the distance d is as described in the following formula. Note that in the formula, c is the speed of light, and T is the intensity modulation period of the measurement light S.

[Formula 2]

$$d = \frac{c \cdot T}{4} \cdot \left(1 + \frac{Q3 - Q1}{Q2 - Q4}\right) \qquad 2$$

The external light illuminance calculation unit 17 calculates external light illuminance $E_A$ of external light irradiated toward the object O at the spectral sensitivity of the optical filter 11 based on the charge amount acquired at the light reception unit 12 and the reflectivity $\rho$ of the object O. When the light-receiving element receives only external light via a lens, the reflected brightness $I_A$ of the external light corresponds to the charge amount acquired at the light-receiving element.

The reflected brightness $I_A$ of the external light can be determined even during the distance measurement operation. At this time, the charge amount acquired at the light-receiving element includes not only the reflected brightness $I_A$ of the external light, as shown in FIG. 1, but also the reflected brightness $I_s$ of the measurement light. A method in which only the reflected brightness $I_A$ of the external light is determined from the acquired charge amount will be described below.

Figure 4:
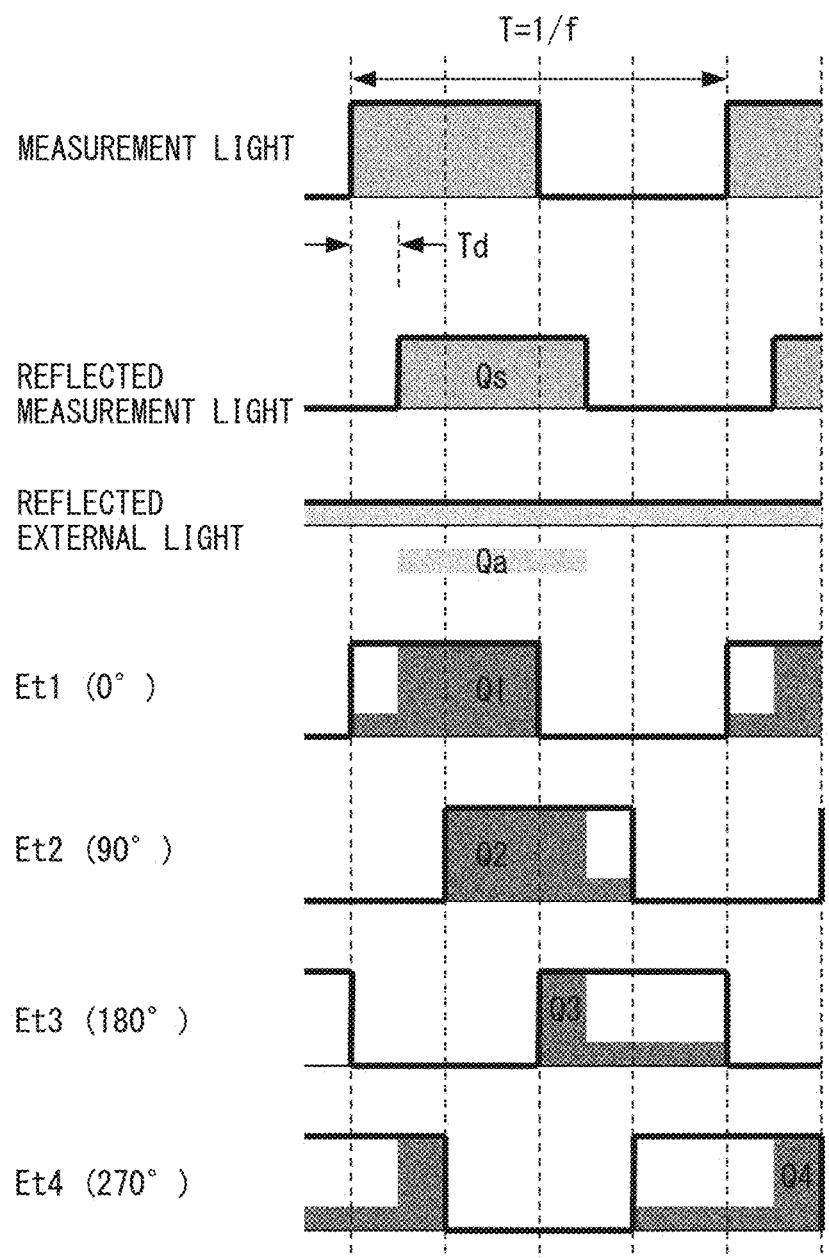
FIG. 4 is a view showing a charge amount including reflected measurement light and reflected external light.

FIG. 4 shows a charge amount including the reflected external light and the reflected measurement light. The charge amount Qs corresponding to the reflected brightness $I_s$ of the measurement light can be determined by removing the charge amount Qa corresponding to the reflected brightness $I_A$ of the external light as shown in, for example, the following formula, by individually calculating the differences between the two charge amounts (Q1 and Q3, Q2 and Q4) having different phases, and adding the absolute values of these two difference results.

[Formula 3]

$$Qs = |Q1 - Q3| + |Q2 - Q4| \qquad 3$$

Thus, the charge amount Qa corresponding to the reflected brightness $I_A$ of the external light may be determined by subtracting twice the charge amount Qs of the measurement light from the result obtained by adding each charge amount Q1 to Q4, and further dividing the calculation result by 2 as shown in, for example, the following formula. Specifically, the external light illuminance $E_A$ can be calculated even during the distance measurement operation in which measurement light is emitted, and as a result, changes of the external light illuminance $E_A$ due to environmental changes can be continuously monitored even during the distance measurement operation.

[Formula 4]

$$Qa = \frac{(Q1 + Q2 + Q3 + Q4) - 2Qs}{2} \qquad 4$$

Furthermore, in particular at the time of installation of the distance measurement device 1, it is not always necessary to perform a distance measurement operation. Thus, by opening only the shutter without emitting measurement light, only the charge amount Qa corresponding to the reflected brightness $I_A$ of the external light is acquired, whereby the external light illuminance $E_A$ can be calculated based on the charge amount Qa corresponding to the reflected brightness $I_A$ of the external light and the reflectivity ρ of the object. In this modified example, the distance measurement device 1 may further comprise means for selecting whether or not to emit the measurement light.

In the calculation of the external light illuminance $E_A$, it is necessary that the reflectivity ρ of the object be known, and thus, by preparing an object having a known reflectivity ρ and placing it in the measurement target space, the external light illuminance $E_A$ can be calculated. Furthermore, the reflectivity ρ of an arbitrary object (i.e., an object having an unknown reflectivity ρ) in the target measurement space can be determined by calculation, and the external light illuminance $E_A$ can be calculated from the determined reflectivity ρ. A method for calculating the reflectivity ρ of an object will be described below.

Figure 5A:
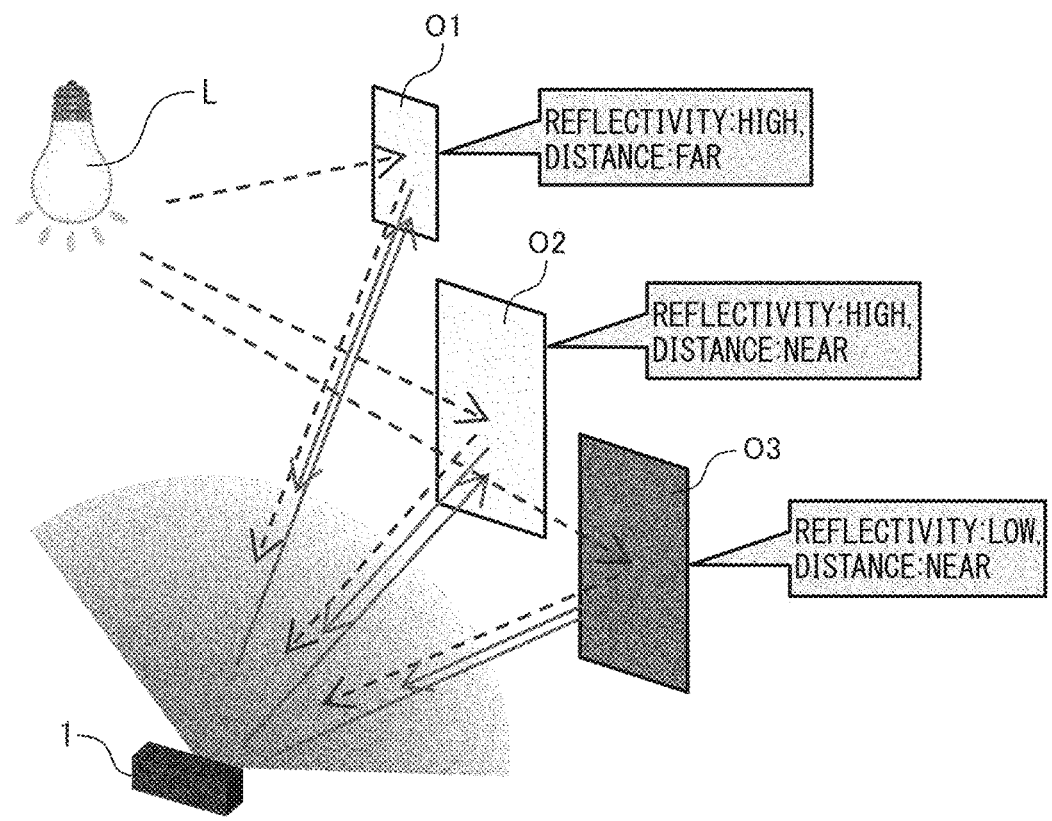
FIG. 5A is a view illustrating the relationship between the reflectivity of an object, the distance to the object, and an acquired charge amount.
Figure 5B:
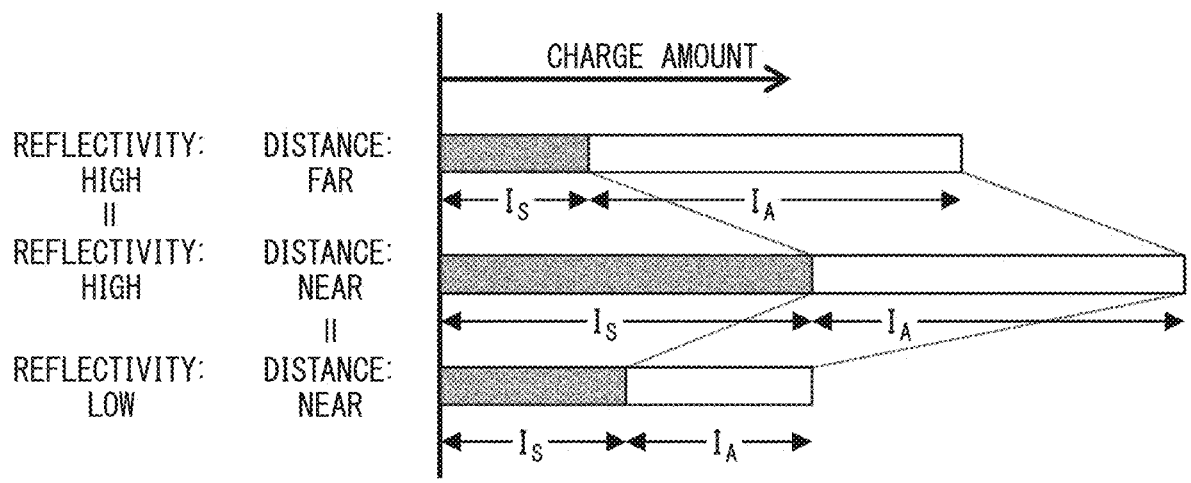
FIG. 5B is a view illustrating the relationship between the reflectivity of an object, the distance to the object, and an acquired charge amount.

FIGS. 5A and 5B illustrate the relationship between the reflectivity of an object, the distance to the object, and the acquired charge amount. FIG. 5A shows an object O1 which has a high reflectivity and which has a far distance, an object O2 which has a high reflectivity and which has a near distance, and an object O3 which has a low reflectivity and which has a near distance, and FIG. 5B shows the three charge amounts (including the reflected brightness $I_s$ of the measurement light and the reflected brightness $I_A$ of the external light) when the reflected light is received from the objects O1, O2, and O3. When the distance from the distance measurement device 1 to the object is far, even when the reflectivity is the same, as for objects O1 and O2, though the reflected brightness $I_s$ of the measurement light is reduced depending on the distance to the object, the reflected brightness $I_A$ of the external light is unchanged under the same external light illuminance. Conversely, when only the reflectivity differs but the distance is the same, as for objects O2 and O3, the reflected brightness $I_s$ of the measurement light and the reflected brightness $I_A$ of the external light change at the same rate. Specifically, the reflectivity ρ of the object is correlated with the distance to the object and the reflected brightness $I_s$ of the measurement light. Similar to formula 1, the reflected brightness $I_s$ of the measurement light has the following relationship between the illuminance Es of the measurement light and the reflectivity ρ of the object.

[Formula 5]

$$I_S = \frac{\rho}{\pi} \cdot E_S \qquad 5$$

Figure 6:
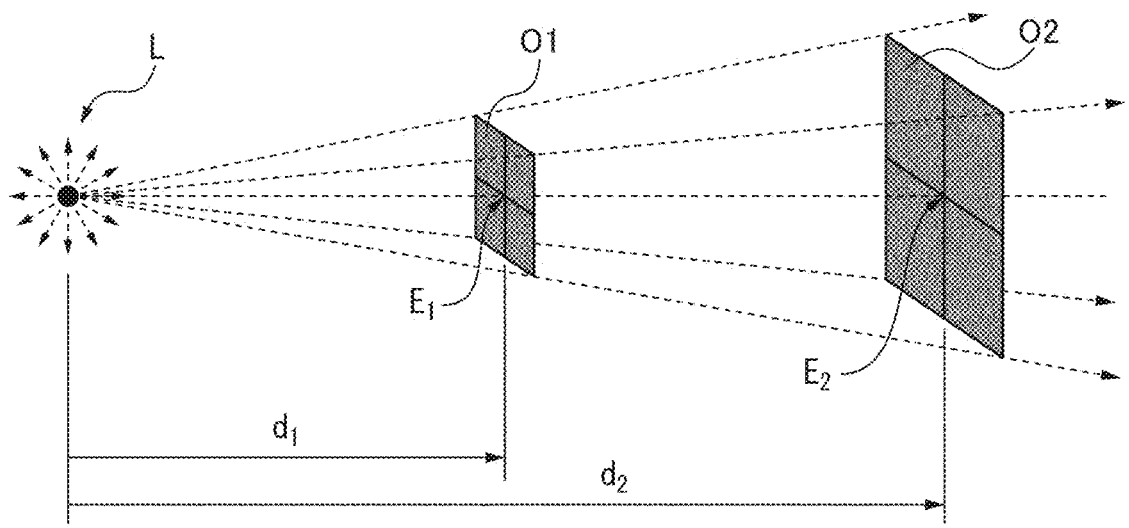
FIG. 6 is a view showing the relationship between illuminance and the distance from a light source.

Furthermore, it is also known that illuminance E generally follows the inverse square law of the distance d to the object O. As shown in FIG. 6, when the distances from the light source L to the two objects O1 and O2 are defined as $d_1$ and $d_2$, respectively, and the intensities of the objects O1 and O2 are $E_1$ and $E_2$, respectively, the following relationship holds between the two intensities $E_1$ and $E_2$. Specifically, if the distance doubles, the illuminance becomes $½^2$, and if the distance triples, the illuminance becomes $⅓^2$.

[Formula 6]

$$E_2 = \frac{1}{(d_2/d_1)^2} \cdot E_1 \qquad 6$$

Thus, the following formula is obtained from formula 6 and formula 5. Note that in the formula, k is a proportionality constant. According to the following formula, it can be understood that the reflectivity ρ of the object can be calculated based on the calculated distance to the object and the reflected brightness $I_s$ of the measurement light determined from each charge amount Q1 to Q4. In other words, when the reflectivity ρ of the object is determined by calculation, measurement light emission is necessary.

[Formula 7]

$$I_S = \frac{\rho}{\pi} \cdot E_S = \frac{k \cdot \rho}{d^2} \qquad 7$$

Figure 7:
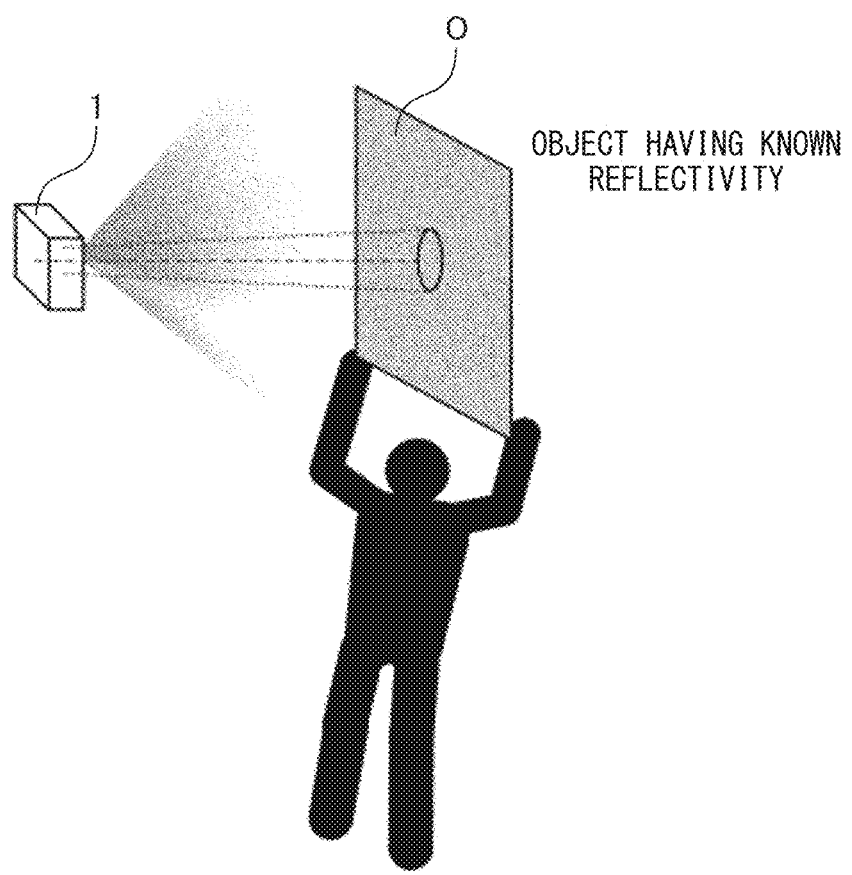
FIG. 7 is a view showing an object having a known reflectivity.

As described above, an object O having a known reflectivity ρ may be prepared, as shown in FIG. 7. Further, as a method for acquiring the reflected brightness $I_A$ of the external light, there is a method of obtaining the reflected brightness $I_A$ from the acquired charge amount without emitting measurement light. By using an object having a known reflectivity ρ and using the reflected brightness $I_A$ determined by such a calculation method, it is also possible to more accurately calculate the external light illuminance $E_A$.

Figure 8:
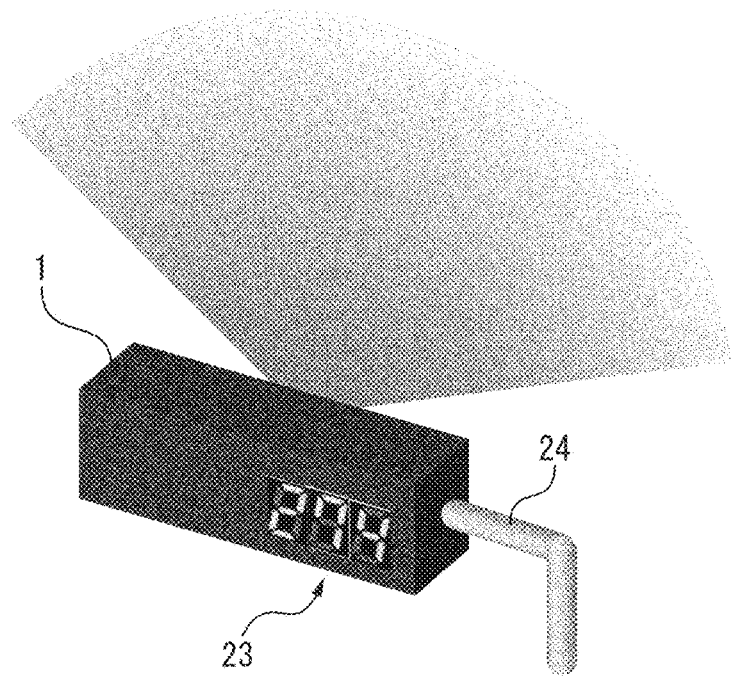
FIG. 8 is a view showing an example of an output unit configured to output external light illuminance.

Referring again to FIG. 3, the output unit 18 outputs the external light illuminance $E_A$ calculated by the external light illuminance calculation unit 17 to the outside. The output unit 18 may comprise a display unit 23 such as an LED display or a liquid crystal display, as shown in, for example, FIG. 8, or alternatively, may comprise a communication unit 24 such as an external output port or network communication device as shown in, for example FIG. 8. As an alternative example, the output unit 18 may comprise an external memory such as a semiconductor memory or a magnetic storage device.

Figure 9A:
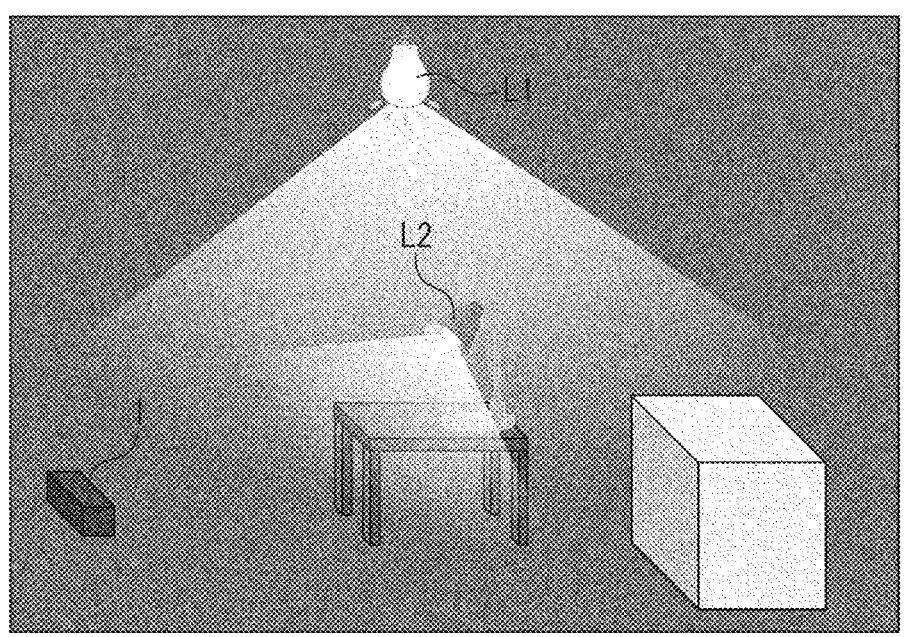
FIG. 9A is a view showing the case in which there is an auxiliary or unintended external light source.
Figure 9B:
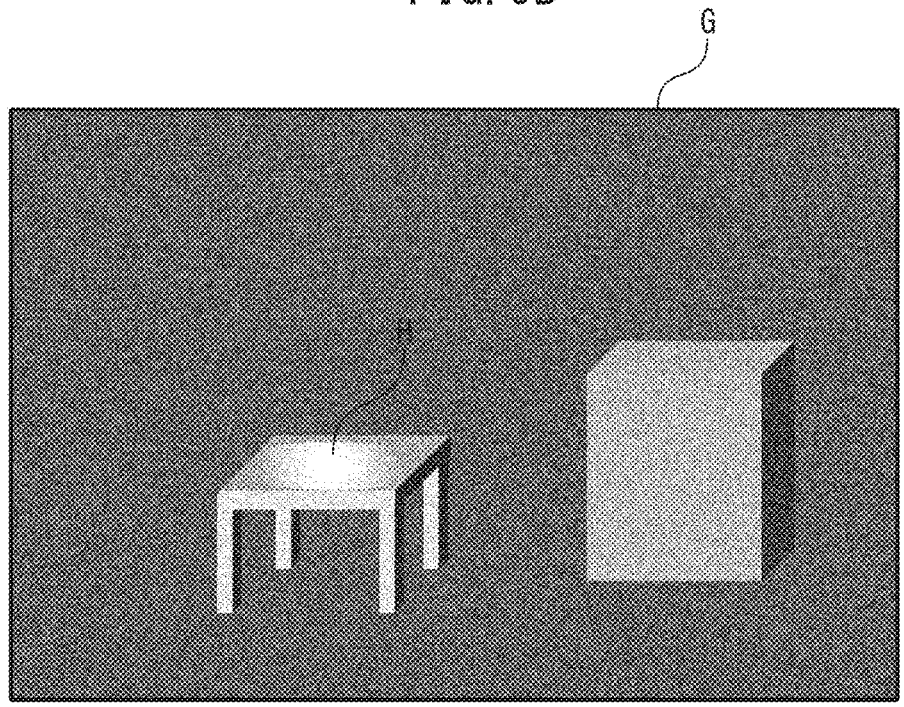
FIG. 9B is a view showing an example of an external light illuminance image.
Figure 10A:
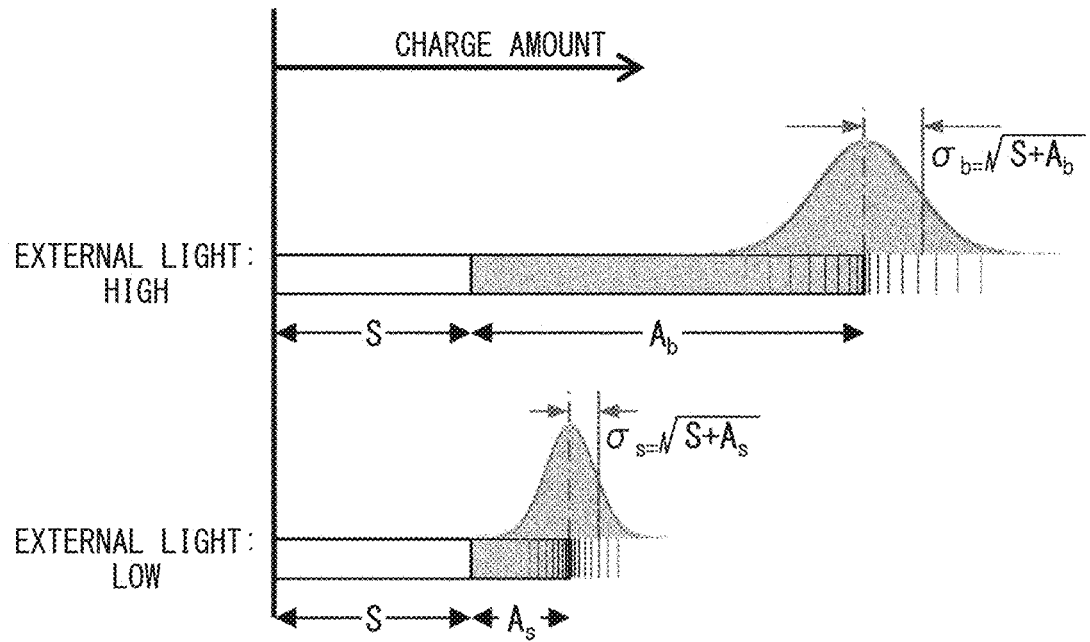
FIG. 10A is a view showing the influence of external light on distance measurement accuracy in the prior art.
Figure 10B:
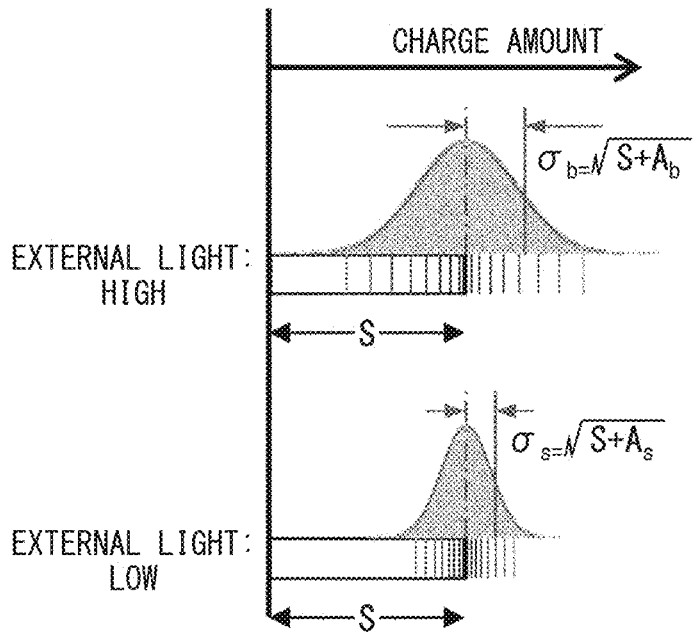
FIG. 10B is a view showing the influence of external light on distance measurement accuracy in the prior art.
Figure 11A:
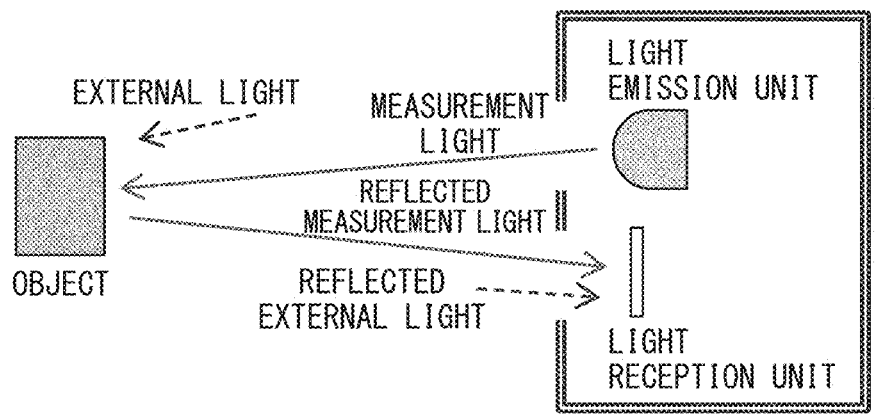
FIG. 11A is a view showing the influence of external light on the inability to measure distance in the prior art.
Figure 11B:
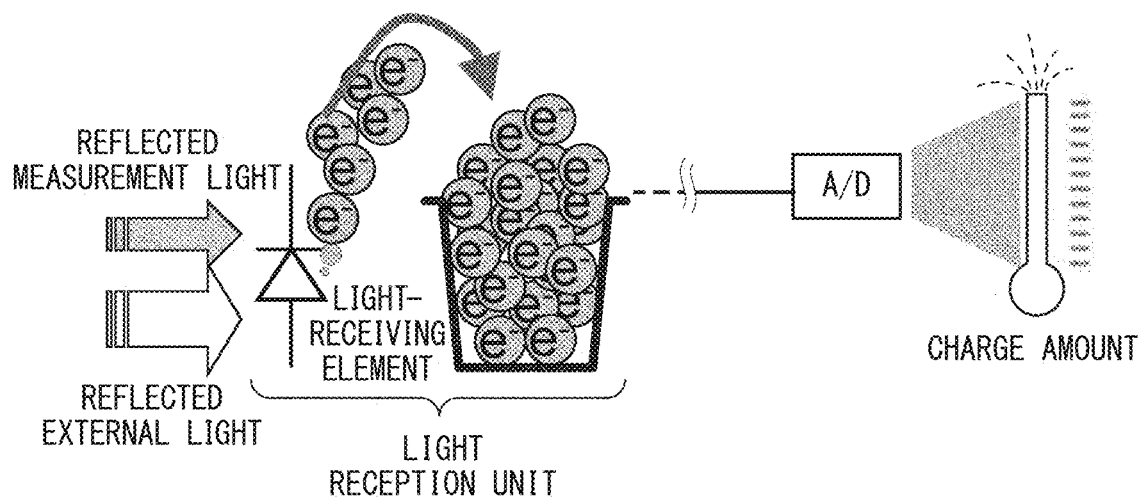
FIG. 11B is a view showing the influence of external light on the inability to measure distance in the prior art.
Figure 12A:
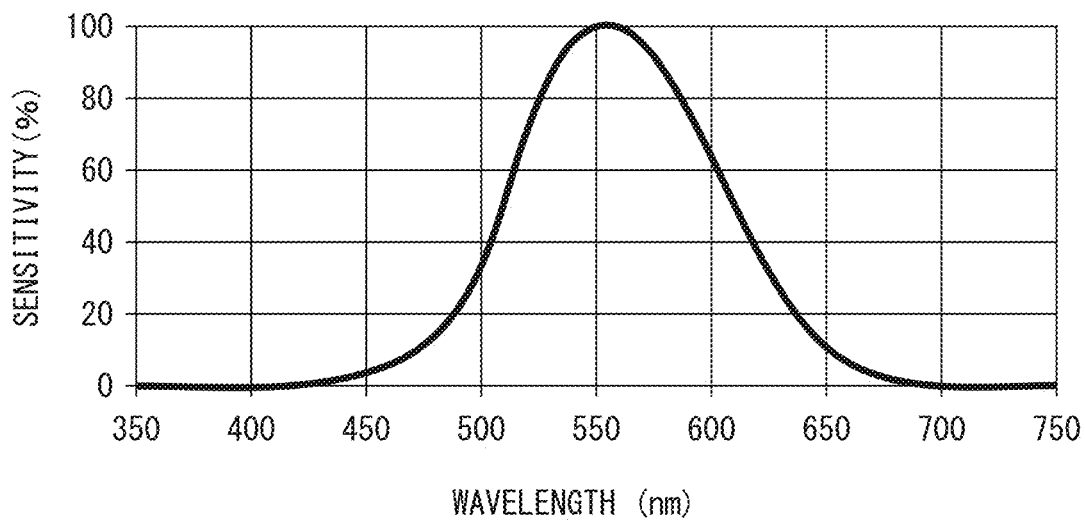
FIG. 12A is a view showing an example of the spectral sensitivity of a conventional lux meter.
Figure 12B:
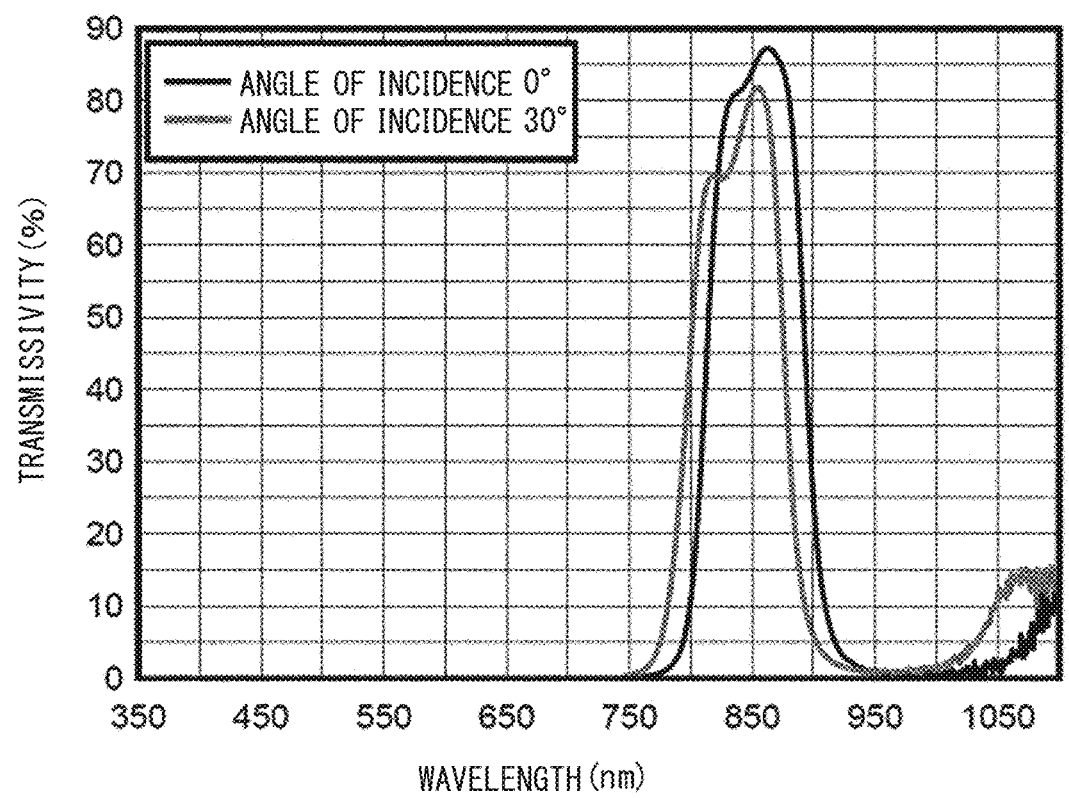
FIG. 12B is a view showing an example of the transmission wavelength of an optical filter in a conventional TOF camera.

When the light reception unit 12 comprises a plurality of two-dimensionally arrayed pixels, such as a CCD image sensor or a CMOS image sensor, the external light illuminance calculation unit 17 may calculate the external light illuminance $E_A$ for each pixel, and the output unit 18 may output an external light illuminance image. An external light illuminance image is particularly effective when there is an auxiliary or unintended external light source L2 other than the external light source L1 in the target measurement space as shown in, for example, FIG. 9A. FIG. 9B shows an external light illuminance image G in which a portion H where the external light is strong due to the external light source L2 can be easily recognized.

Referring again to FIG. 3, when the external light illuminance $E_A$ is equal to or greater than a threshold value, the warning unit 19 outputs a warning signal such as a warning sound or a warning message to the outside. As a result of this warning signal, danger can be notified when a strong external light that is out of the accuracy guarantee of the distance measurement device 1 is detected. When the distance measurement device 1 is used in an application system such as an object monitoring system, the warning signal may be used as a power stop signal of an industrial machine such as a robot or a machine tool.

Referring yet again to FIG. 3, the image output unit 20 outputs to the outside an external light illuminance emphasis image in which pixels with the external light illuminance $E_A$ equal to or greater than a threshold value are highlighted. The external light illuminance emphasis image is an image in which pixels having an external light illuminance $E_A$ equal to or greater than a threshold value are highlighted on an image such as a distance image or a luminance image (for example, an image of the reflected brightness $I_s$ of measurement light, which is generally referred to as an IR (near infrared) image, or an image of the reflected brightness $I_A$ of external light). As a result of this external light illuminance emphasis image, it is possible to easily visually recognize portions where external light which is stronger than a specified value are observed on the image.

According to the embodiments described above, there can be provided a distance measurement device which can measure external light illuminance $E_A$ in accordance with the spectral sensitivity of the distance measurement device 1 without the need for an illuminance meter, spectrometer, etc. In an environment in which the distance measurement device 1 is used, for example, in an FA (factory automation) environment, devices (for example, laser scanners, proximity sensors using near-infrared light, wireless communication devices for IrDA (infrared data association) communication, near-infrared heaters, other TOF cameras, etc.) which use near-infrared light as external light are often used, and the external light of these instruments is conventionally invisible to humans and may not be observable with commercially available illuminance meters in some cases. Thus, it is very significant that the distance measurement device 1 is capable of measuring external light illuminance with the strong influence on distance measurement accuracy or inability to perform distance measurement.

Furthermore, since the external light illuminance $E_A$ that can affect distance measurement accuracy or the inability to perform distance measurement can be more accurately understood, and it is possible to accurately determine whether or not the external light is within the expected range, it is possible to provide a distance measurement device 1 which can operate stably in terms of distance measurement accuracy or the inability to perform distance measurement. Furthermore, since the external light illuminance $E_A$ can be measured using the object to be measured, external light due to environmental changes can be continuously monitored not only at the time of installation of the distance measurement device 1 but also during the distance measurement operation.

The program executed by the processor described above may be stored on a computer-readable nontransitory storage medium such as a CD-ROM, etc.

Though the various of the embodiments have been described in the present specification, the present invention is not limited to the embodiments described above, and it should be appreciated that various changes can be made within the scope of the following claims.

The invention claimed is:

1. A distance measurement device, comprising:
a light emission unit which is capable of emitting measurement light to be irradiated toward an object,
a light reception unit configured to receive light from the object via an optical filter through which light having the same wavelength band as the measurement light passes,
a distance calculation unit configured to calculate a distance to the object based on each charge amount obtained by accumulating a charge corresponding to the received light at a plurality of timings which are delayed by a predetermined phase with respect to emission timing of the measurement light, and
an external light illuminance calculation unit configured to calculate external light illuminance of external light illuminating the object at the spectral sensitivity of the optical filter based on the charge amounts acquired at the light reception unit and a reflectivity of the object.

2. The distance measurement device according to claim 1, wherein the light passing through the optical filter is near-infrared light.

3. The distance measurement device according to claim 1, wherein the reflectivity of the object is calculated based on the calculated distance to the object and reflected brightness of the measurement light reflected at the object which is determined from each charge amount.

4. The distance measurement device according to claim 1, wherein the reflectivity of the object is known.

5. The distance measurement device according to claim 1, wherein the external light illuminance is calculated based on reflected brightness of external light reflected at the object which is determined from each charge amount and the reflectivity of the object.

6. The distance measurement device according to claim 1, further comprising an output unit configured to output the external light illuminance.

7. The distance measurement device according to claim 6, wherein the light reception unit comprises a plurality of two-dimensionally arrayed pixels, the external light illuminance calculation unit calculates an external light illuminance for each pixel, and the output unit outputs an external light illuminance image.

8. The distance measurement device according to claim 1, further comprising a warning unit configured to output a warning signal when the external light illuminance is equal to or greater than a threshold value.

9. The distance measurement device according to claim 1, further comprising an image output unit configured to output an external light illuminance emphasis image in which pixels with the external light illuminance equal to or greater than a threshold value are highlighted.

10. The distance measurement device according to claim 1, wherein a charge amount corresponding to reflected brightness of the external light reflected at the object is determined by the following formula:

$$Qa=\{(Q1+Q2+Q3+Q4)-2Qs\}/2,$$

where Qa is the charge amount corresponding to the reflected brightness of the external light reflected at the object,
Q1, Q2, Q3, Q4 respectively represent the charge amounts obtained at the plurality of timings, and
Qs is a charge amount corresponding to reflected brightness of the measurement light reflected at the object.

11. An external light illuminance measurement method, comprising the steps of:
selecting whether or not to emit measurement light to be irradiated toward an object,
receiving light from the object via an optical filter through which light having the same wavelength band as the measurement light passes, and
calculating external light illuminance of external light illuminating the object at the spectral sensitivity of the optical filter based on charge amounts corresponding to the received light and a reflectivity of the object.

* * * * *